Jan. 28, 1964  T. W. MERRITT ETAL  3,119,401
MILK PIPELINE WASHING SYSTEM
Filed Feb. 2, 1961  3 Sheets-Sheet 1
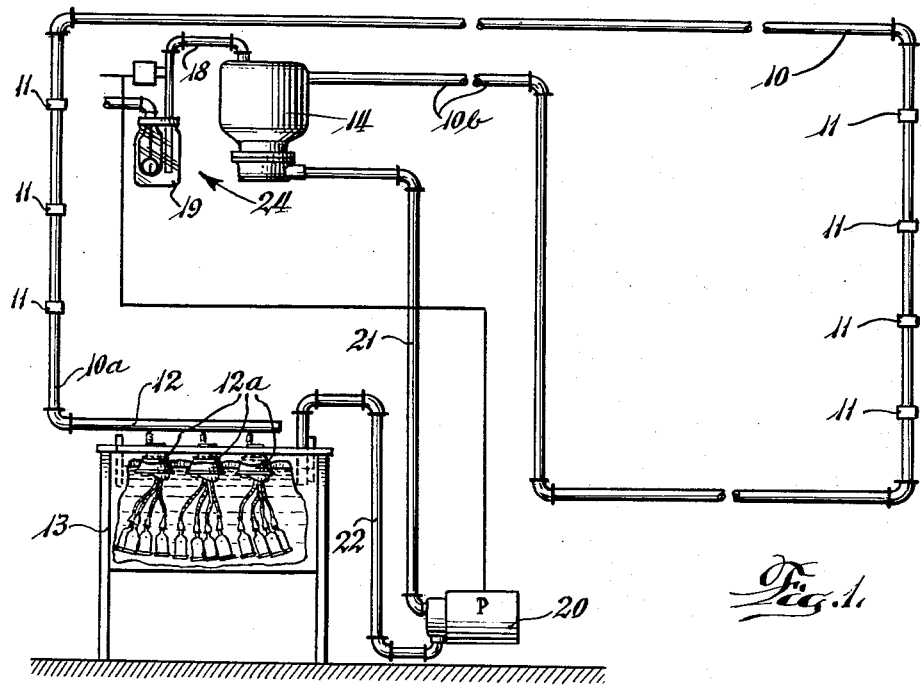
Fig. 1.
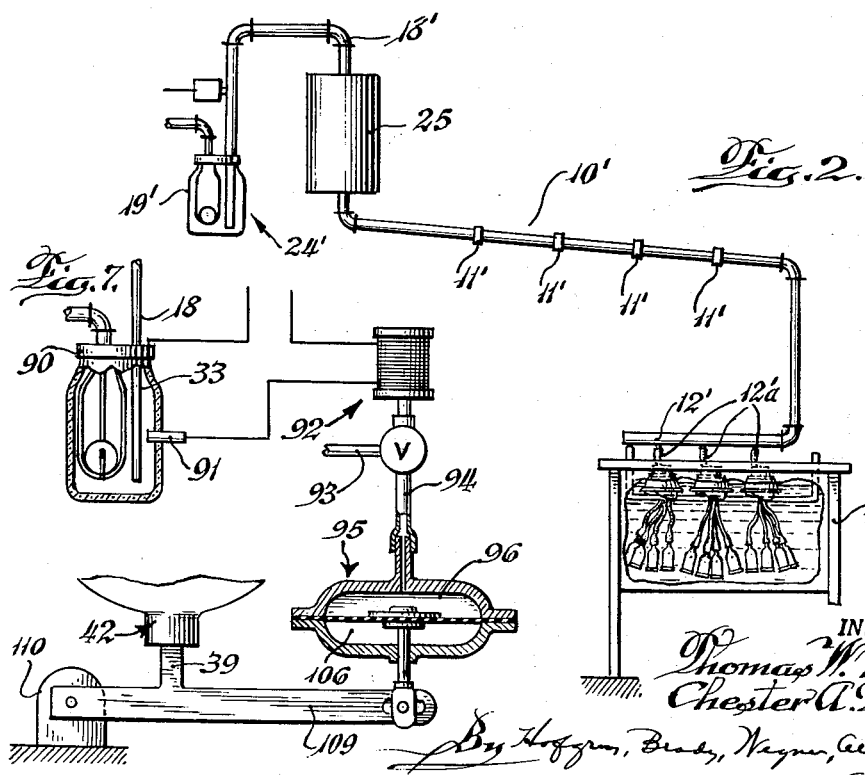
Fig. 2.
Fig. 7.
INVENTORS:
Thomas W. Merritt
Chester A. Thomas
By Hofgren, Brady, Wegner, Allen & Stellman
Attorneys.

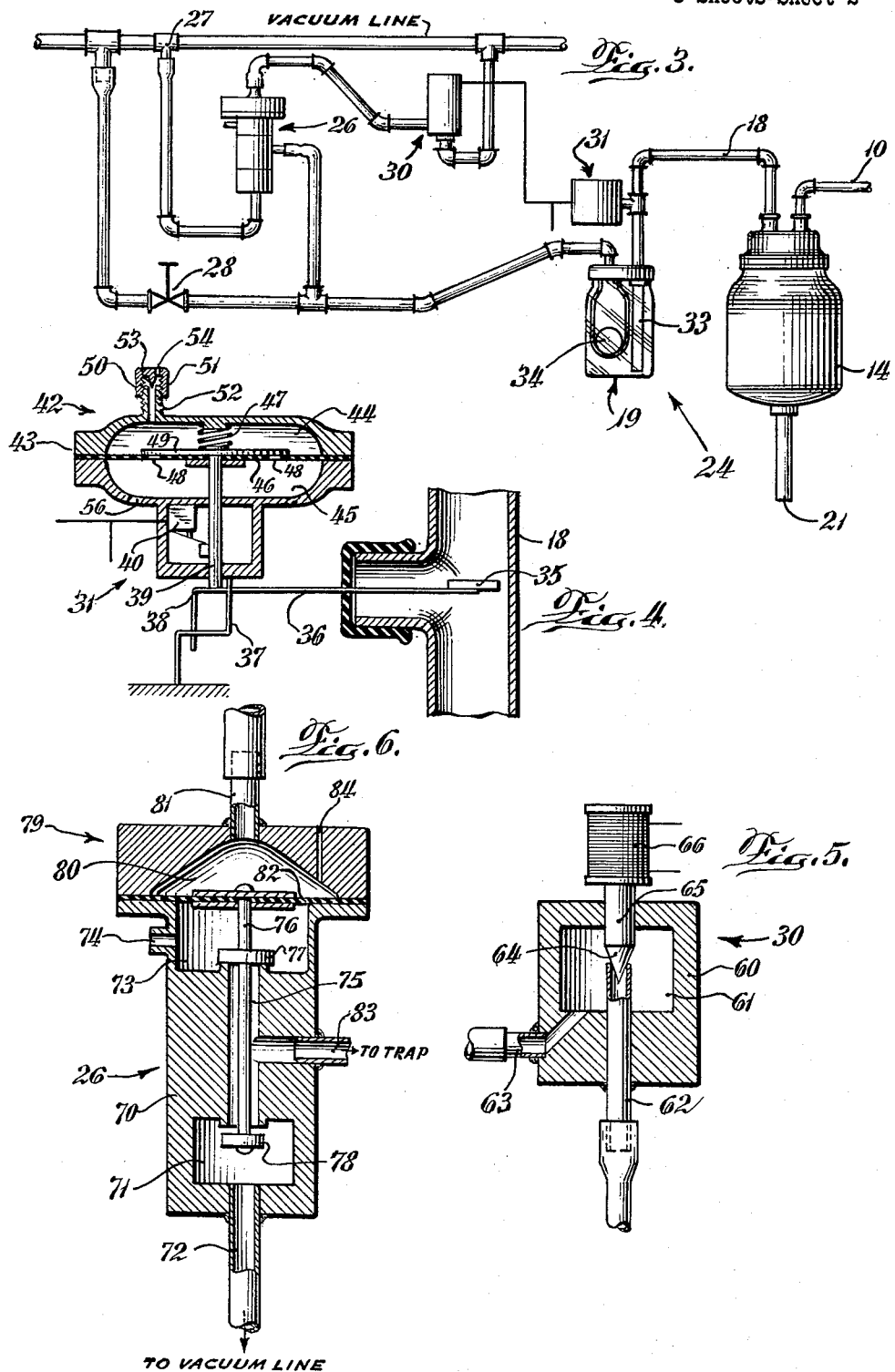

Jan. 28, 1964  T. W. MERRITT ETAL  3,119,401
MILK PIPELINE WASHING SYSTEM
Filed Feb. 2, 1961  3 Sheets-Sheet 3
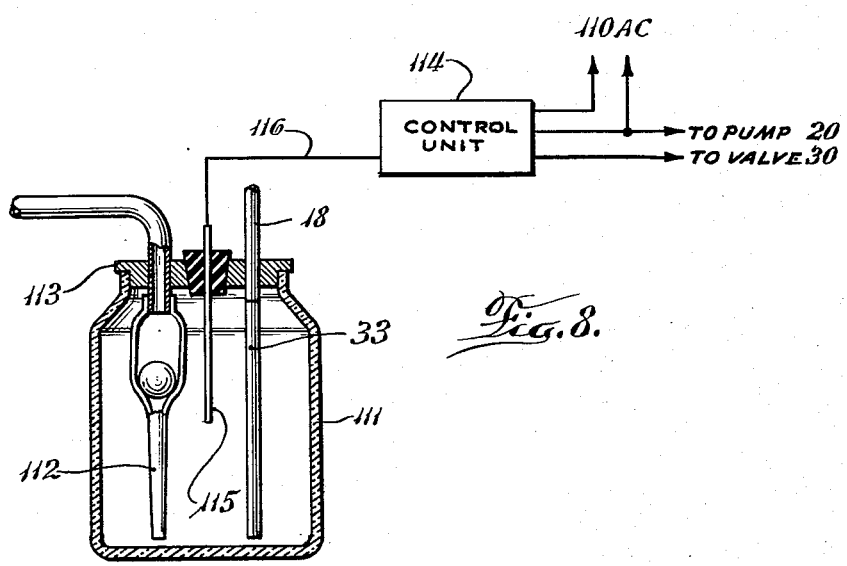
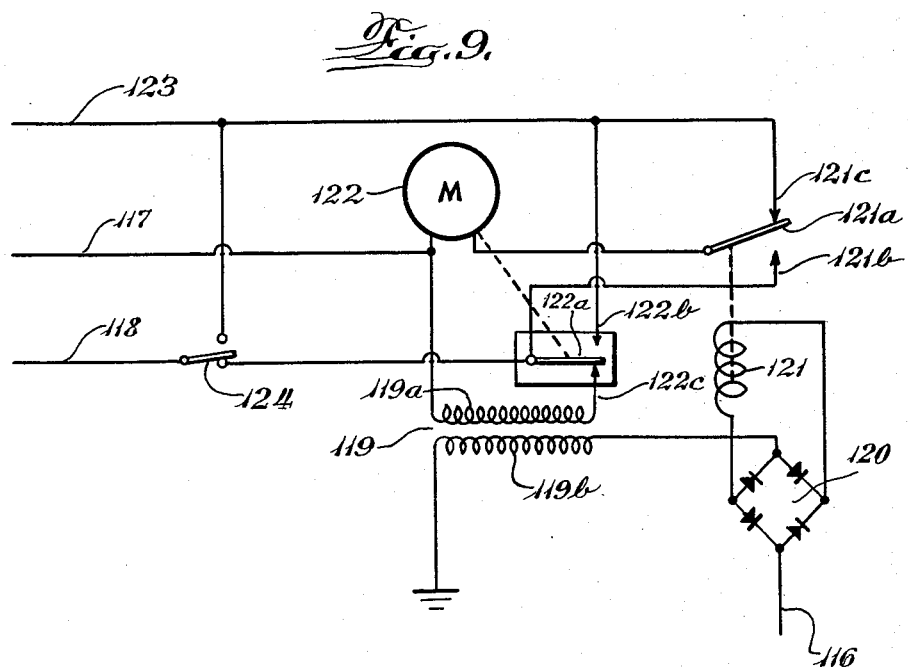

United States Patent Office 3,119,401
Patented Jan. 28, 1964

3,119,401
MILK PIPELINE WASHING SYSTEM
Thomas W. Merritt, St. Charles, and Chester A. Thomas, Oak Park, Ill., assignors to Babson Bros. Co., a corporation of Illinois
Filed Feb. 2, 1961, Ser. No. 86,615
13 Claims. (Cl. 134—57)

This invention relates to a washing system, and more particularly to a washing arrangement for a carry away milking system.

Carry away milking systems are finding increased use in modern dairy farms, in part because of the reduction in manpower required in their operation, and because of the increased efficiency and improved sanitary standards which may be obtained.

Most carry away milking systems are used in one of two types of installations. One type is a stanchion barn in which a large number of cows are secured in stalls for milking. The milkers are taken to the cows which are milked in the stalls. Each milker is connected with a carry away milk line which generally extends through the entire barn area, as over the tops of the heads of the stalls, and is necessarily rather long. The second type of installation is a milking parlor where a small number of cows are admitted in groups or one at a time and go to the milkers, and the milk line is relatively short. In a stanchion system, the length of the line is so great that the draining time is excessive and circulating systems have been developed. With the short parlor milk line, a flush-type washing system may be used in which a washing solution is drawn into the milk line by vacuum, the vacuum interrupted, and the washing solution permitted to drain back out of the line.

Milk handling systems in a dairy barn often include a small milk receiver of several gallons' capacity in which milk is initially collected before being discharged to a milk bulk tank or a final receiver. Milk receivers generally have milk inlet and vacuum connections at or near the top with an outlet in the bottom which is connected with an intermittently operating pump that may, for example, transfer the milk to the bulk tank. Milk splashes on the upper inside surface of the receiver even though the receiver is not filled completely, and milk vapor gets into the vacuum connection. Adequate "in place" cleaning of the milk receiver and the vacuum connection present a problem. Thomas patent U.S. 2,878,819, shows a system in which the milk receiver and the vacuum connections are kept continually filled with washing solution during the washing operation. However, it has been found that better washing is obtained by alternately filling and at least partially emptying the apparatus, providing a turbulent water action on the milk and vapor contacted surfaces.

A primary object of this invention is the provision of an improved washing arrangement for carry away milking systems.

Another object of this invention is the provision of improved control means in a washing arrangement for carry away milking systems.

A feature of the invention is the provision of a washing arrangement for a carry away milking system including a reservoir for washing solution and a receiver chamber connected by a milk line, a vacuum conduit connected with the receiver chamber for drawing washing solution from the reservoir through the milk line and into the receiver chamber, with intermittently operable means connected with the receiver chamber for removing washing solution from the receiver chamber, and means responsive to the presence of washing solution in the vacuum conduit for discontinuing the application of vacuum to the receiver chamber and for actuating the intermittently operable means for at least partially emptying the receiver chamber. A related feature of the invention resides in connecting the vacuum conduit to the top of the receiver chamber for thoroughly washing the top of the milk receiver with turbulent washing solution.

Another feature of the invention is the provision of control means in a vacuum-operated washing arrangement for a milking system having a milk line, the control means comprising a vacuum conduit connected between a source of vacuum and the milking system for drawing washing solution through the milk line, with a normally open vacuum shut-off valve between the source of vacuum and the vacuum conduit, and control means responsive to the presence of washing solution in the vacuum conduit for closing the vacuum shut-off valve to discontinue the application of vacuum to the milk line.

A related feature of such a washing arrangement in a carry away milking system in which the milk line discharges milk into a milk receiver which is emptied by a pump, is the provision wherein the control means additionally intermittently actuates the normally inoperative pump for at least partially emptying the milk receiver of washing solution responsive to the presence of washing solution in the vacuum conduit.

Another feature of the invention is the provision of a vacuum control arrangement for a milk line washing system in which a vacuum conduit is connected with the milk line for drawing washing solution therethrough, with sensing means associated with the vacuum line and responsive to the presence of washing solution therein to complete an electric circuit, wherein an electrically actuated vacuum valve is connected in the electric circuit and opened upon actuation of the sensing means, and with a pneumatic valve operatively connected with the electrically actuated valve and actuated by vacuum when the electrically actuated valve is open, to control the application of vacuum to the milk line.

Further features and advantages of the invention will be readily apparent from the following specification and from the drawings, in which:

FIGURE 1 is a diagrammatic view of a recirculating washing arrangement as applied to the carry away milking system of the stanchion barn type, and embodying the invention;

FIGURE 2 is a diagrammatic view of a flush type washing arrangement as applied to a carry away parlor milking system, and embodying the invention;

FIGURE 3 is a diagrammatic view illustrating an embodiment of control means for the washing arrangement;

FIGURE 4 is a sectional view of an embodiment of a sensing and timing device in the control means;

FIGURE 5 is a sectional view of a solenoid actuated vacuum valve in the control means;

FIGURE 6 is a sectional view of a vacuum actuated air bleed and vacuum shut-off valve in the control means;

FIGURE 7 is a sectional view of another embodiment of a sensing and timing device in the control means;

FIGURE 8 is a sectional view of still another embodiment of a sensing and timing device in the control means; and FIGURE 9 is a schematic diagram of a control circuit for the sensing and timing device of FIGURE 8.

The invention is directed, in brief, to a washing assembly for a carry away milking system in which washing solution is drawn from a reservoir through a milk line and into a receiver chamber, such as suitable milk receiver, by vacuum applied through a conduit connected to the top portion of the chamber. When the receiver chamber is completely filled with washing solution, the washing solution is drawn through the vacuum conduit thereby actuating control means for discontinuing the application of vacuum to the receiver chamber. In one system a milk pump is actuated by the control means for at least partially emptying the receiver chamber. In another system, upon discontinuing the application of vacuum to the receiver chamber the washing solution flows by gravity through an inclined milk line toward the reservoir. By repeatedly filling and partially emptying the receiver chamber, the top of the chamber and the vacuum conduit are thoroughly washed by turbulent washing solution.

Referring to the drawings, FIGURE 1 illustrates the washing arrangement applied to a milking system having a milk line 10 with stall cocks 11, to which a suitable milker is connected during milking, and which are closed during washing. One end 10a of the milk line is closed during milking, and for washing this end is connected to a manifold 12 having milker 12a suitably connected thereto with their teat cups immersed in a suitable washing solution in a reservoir 13. A second end 10b of the milk line 10 is connected to the top portion of a receiver chamber, in the form of a suitable milk receiver 14. Conduit means including a vacuum conduit 18 connected between a top portion of the milk receiver 14 and a trap 19, which is connected with a source of vacuum, is provided for drawing washing solution from the reservoir 13 through the milk line 10 and into the milk receiver 14, filling the milk receiver. Intermittently operable means is provided in the form of a milk pump 20 having its inlet connected through pipe line 21 with the milk receiver 14, for intermittently at least partially emptying the milk receiver. The pump outlet is connected with a return line 22, for returning washing solution to the reservoir 13. During milking the pump outlet is connected with suitable milk handling equipment such as a milk bulk tank.

Control means 24, which is fully illustrated in FIGURE 3, provides a means responsive to the presence of washing solution in the vacuum conduit 18 for discontinuing the application of vacuum to the milk receiver 14 after filling of the milk receiver with washing solution, and for actuating the pump 20 for at least partially emptying the milk receiver of washing solution. Repeated filling and partial emptying of the milk receiver provides for complete washing of the milk line, receiver and vacuum connections.

Referring to the modified embodiment of FIGURE 2, the milk line 10' has one end connected by manifold 12 and milkers 12a' to the reservoir 13' of washing solution, and is inclined upwardly from the wash line to a second end connected with the receiver chamber, in the form of a closed tank 25. The vacuum conduit 18 connects a top portion of the tank 25 with the trap 19', and control means 24' regulate the application of vacuum to the tank for drawing washing solution from the reservoir 13' through the milk line 10' to fill the tank 25. The control means is the same as that previously described less only the actuating means for a pump, which is not required.

The control means 24 is illustrated in FIGURE 3 as it is applied to the milking system shown in FIGURE 1. The conduit means, for applying vacuum to the milk receiver 14, includes the vacuum conduit 18 and the trap 19, and is connected, through a normally open vacuum shut-off valve in a pneumatic air bleed and vacuum shut-off valve assembly 26, to a source of vacuum, such as a vacuum line 27. During milking, a valve 28 is open for direct connection with the vacuum line 27, thereby bypassing the valve assembly 26, and during washing the valve 28 is closed. The vacuum actuated air bleed and vacuum shut-off valve 26 is actuated by vacuum applied through a normally closed electrical solenoid actuated vacuum valve 30 connected with the vacuum line 27. The solenoid valve 30 is opened when an electric circuit is closed by a switch in a sensing and timing device 31, responsive to the flow of washing solution in the vacuum conduit 18. Closing of the electric circuit also actuates the pump 20, and the circuit remains closed sufficiently long for at least partially emptying the milk receiver 14. By repeatedly filling and partially emptying the milk receiver 14, the top of the milk receiver is repeatedly washed by turbulent washing solution, to more thoroughly clean the top.

The washing solution is drawn through the vacuum conduit 18 and collects in the trap 19. An extension 33, extending to the bottom of the trap, is provided on the end of vacuum conduit 18 so that washing solution in the trap 19 may be returned to the milk receiver 14 by a siphoning effect as washing solution is withdrawn from the milk receiver 14 during operation of the pump 20. During milking operation the extension 33 is removed. The trap 19 has a buoyant ball valve 34 for closing the vacuum connection to the trap in the event that the trap fills with milk or washing solution, to prevent liquid being drawn into the valves and the vacuum line 27.

The sensing and timing device 31 is shown in FIGURE 4. Means to sense the flow of washing solution through the vacuum conduit 18 is provided in the form of a vane or paddle 35 secured to an arm 36 which is rotatably mounted at an intermediate point to a fixed guide and fulcrum 37. The flow of washing solution through the vacuum conduit 18 rotates the vane 35 downwardly and a free end 38 of the arm 36 upwardly, which in turn moves a stem 39 upwardly to actuate means responsive to the sensing means for discontinuing the applicaton of vacuum, and for actuating the pump, by closing an electric switch 40. Closing of the switch energizes solenoid actuated vacuum valve 30 for opening the valve and actuates the pump 20. Means for permitting adequate time for the milk receiver 14 to empty, at least partially, is provided in the form of a timer 42. The timer 42 includes a housing 43 which is divided into an upper chamber 44 and a lower chamber 45 sealed from each other by a flexible diaphragm clamped between upper and lower portions of the housing 43 and suitably secured to the stem 39, all in a fluid-tight manner. A spring 47 may be provided to maintain the diaphragm 46 in the normal position illustrated in FIGURE 4. Upon upward movement of the stem 39 the diaphragm 46 is forced upwardly and air compressed in upper chamber 44 escapes into the lower chamber 45 through a suitable check valve which may comprise openings 48 in the diaphragm 46, with the openings normally sealed by an overlying disk 49 secured to the stem 39. The time required for downward movement of the diaphragm 46 and the stem 39 to open the electric switch 40 is controlled by regulating the admission of air into the upper chamber 47 by means of a suitable valve 50. The valve 50 may comprise a cap 51 adjustably threaded on a hollow boss 52, which opens into the upper chamber 44, to vary the amount of opening between a needle valve 53 on the cap and a cooperating valve seat on the top end of the hollow boss 52 to control the admission of air from a bleed opening 54 in the cap 51, into the upper chamber 44. The lower chamber 45 may be provided with a bleed opening 56 for the free passage of air out of the lower chamber. As the diaphragm 46 moves downwardly, the switch 40 is opened de-energizing and closing the solenoid-actuated vacuum valve 30, and stopping the pump 15. The timer 42 is preferably adjusted to maintain the switch 40 closed for sufficient time to permit the pump to remove a substantial quantity of washing solution from the full milk receiver, possibly half of the washing solution in the full receiver.

The solenoid-operated vacuum valve 30 is shown in FIGURE 5. The valve includes a housing 60 having a chamber 61 communicating through a tube 62 with a suitable source of vacuum such as vacuum line 27. The chamber 61 communicates through a line 63 with the vacuum-actuated air bleed and vacuum shut-off valve 26.

A vacuum valve 64 in the chamber 61 cooperates with a valve seat on the inner end of tube 62 to control the application of vacuum to the vacuum-actuated air bleed and vacuum shut-off valve 26. The valve 64 is connected by a stem 65 to the core of a solenoid 66 which is energized by the closing of switch 40 in the sensing timing device 31 to open the valve 64.

The vacuum-actuated air bleed and vacuum shut-off valve 26 is shown in FIGURE 6. The valve 26 includes a housing 70 having a vacuum chamber 71 connected through a line 72 with a suitable source of vacuum such as vacuum line 27, and an air bleed chamber 73 having an air bleed opening 74. The vacuum chamber 71 and the air bleed chamber 73 are connected by a passage 75. A valve stem 76 extends through the passage 75 and is secured to an air bleed valve 77 which cooperates with a valve seat on the end of passage 75 opening into the air bleed chamber 73, and a vacuum shut-off valve 78 which cooperates with a valve seat on the end of the passage 75 opening into the vacuum chamber 71. The housing 70 also houses a vacuum motor 79 which includes a control vacuum chamber 80 connected through a line 81 with the line 63 which communicates with the vacuum chamber 61 in solenoid actuated vacuum valve 30. The control vacuum chamber 80 is sealed from the air bleed chamber 73 by a flexible diaphragm 82 which is clamped between upper and lower housing portions and connected with the valve stems 76, all in a fluid-tight manner. The passage 75 communicates with the trap 19 through a line 83. When the air bleed and vacuum shut-off valve 26 is in a normal position, as illustrated in FIGURE 6, the air bleed valve 77 is closed, and the vacuum shut-off valve 78 is open and vacuum is applied from vacuum line 27 to trap 19, and through vacuum conduit 18 to the milk receiver 14.

As previously described, when washing solution flows through the vacuum conduit 18 the solenoid-actuated vacuum valve 30 is opened. Vacuum is then applied in the control vacuum chamber 80 to draw the flexible diaphragm 82 and the valve stem 76 upwardly for closing the vacuum shut-off valve 78 and opening the air bleed valve 77, thereby discontinuing the application of vacuum and venting the line 83 and the trap 19. Vacuum which is constantly applied during washing in vacuum chamber 71 tends to open the vacuum shut-off valve 78 when it is closed, and when vacuum is discontinued in the control vacuum chamber 80, the vacuum shut-off valve 78 opens and air bleed valve 77 closes. If desired, an air blede pasage 84 may be provided in the control vacuum chamber 80.

To summarize the operation of the control means 24, when vacuum is applied through vacuum conduit 18 to the receiver chamber either the milk receiver 14 in FIGURE 1, or the tank 25 in FIGURE 2, washing solution is drawn from the reservoir 13 through the milk line 10 to completely fill the receiver chamber, and then through the vacuum conduit 18 and into the trap 19. The sensing and timing device 31 includes sensing means in the form of the vane 35 which is responsive to the flow of washing solution through the vacuum conduit 18 to close the electric switch 40, thereby simultaneously energizing the solenoid 66 to open the solenoid-actuated vacuum valve 30, and starting the pump 15 in operation to empty, at least partially, the receiver chamber 14 of washing solution. Opening of the solenoid-operated vacuum shut-off valve 30 actuates the vacuum-actuated air bleed and vacuum shut-off valve 26 to close the vacuum shut-off valve 78 and open the air bleed valve 77, thereby discontinuing the application of vacuum to the receiver chamber. The timer 42 in the sensing and timing device 31 maintains the control means in operation for a sufficient period of time for the receiver chamber to be emptied of washing solution sufficiently to create turbulence when washing solution is again drawn into the receiver chamber. The operation of the control means in the embodiment illustrated in FIGURE 2 is the same as that previously described, except for an electric circuit for controlling a pump, which is not required, and upon discontinuing the application of vacuum to the tank 25 and opening the air bleed valve 77 and the air vent, washing solution flows by gravity toward the reservoir 13'.

Referring to FIGURE 7, another embodiment of a sensing device is illustrated. In lieu of the previously described sensing device including vane 35 in the vacuum conduit 18, the trap 19 is provided with sensing means including a metal cap 90 on the trap connected with a metal extension 33 extending to near the bottom of the trap, and an electrode 91 spaced from the bottom of the trap and insulated from the cap 90 and extension 33. As washing solution is drawn by vacuum through vacuum conduit 18 and into the trap 19 a circuit is closed through the washing solution between the electrode 91 and the extension 33, energizing means responsive to the sensing means for closing switch 40 and actuating the timer 42. More particularly, closing the circuit energizes a solenoid-actuated vacuum valve 92, opening the valve. The solenoid-actuated vacuum valve 92 is similar to the previously described valve 30, shown in FIGURE 5, and has a vacuum connection 93 to the vacuum line 27, and a connection 94 to a vacuum motor 95, which is similar to the vacuum motor 79 shown in FIGURE 6. When the valve 92 is open, vacuum is applied to an upper chamber 96 of the vacuum motor 95, drawing a diaphragm 97 and a stem 98 attached to the diaphragm upwardly. The lower end of the stem 98 is connected to an end of lever 99 pivoted at an opposite end to a fixed support 100 and having an intermediate portion engaging the stem 39 of the previously described timer 42. Upward movement of the vacuum motor stem 98 raises the timer stem 39. As previously described, upward movement of the timer stem 39 closes the switch 40, for discontinuing the application of vacuum to the receiver chamber, and for actuating the pump 15.

FIGURE 8 illustrates a preferred form of a sensing and timing device. In response to an electric control circuit actuated by an electric current through washing solution between a pair of electrodes in the trap, the application of vacuum is discontinued and the air bleed 74 into the vacuum conduit is opened, and simultaneously therewith the pump 20 is operated, all for a period of time adequate for at least partially emptying the receiver chamber, as 14 or 25.

Referring to FIGURE 8, a trap 111 has a float retained in a metal cage 112 for closing the vacuum inlet should the trap almost fill with liquid. The cage 111 extends to a point near the bottom of the trap and is attached to a metal trap lid 113, which is preferably electrically grounded. When the trap 111 is partially filled with washing solution, after filling of the receiver chamber, 14 or 25, and vacuum conduit 18, a liquid level sensing circuit is completed to a control unit 114 through the washing solution between the cage 112 and an electrode 115 which is insulated from the lid 113 and spaced from the trap bottom to determine the permissible level of washing solution within the trap. Electric line 116 connects the electrode 115 and the control unit 114.

Referring now to FIGURE 9 of the drawings, electric lines 117 and 118 are connected with a suitable source of power, as 110 volts A.C. The liquid level sensing circuit is energized from a step-down transformer 119, the primary winding 119a of which is connected across lines 117 and 118. The secondary winding 119b of the step-down transformer has one terminal connected with the trap lid 113, as through a common ground connection, and the other terminal connected to a full wave rectifier 120 in series with electrode 115. A direct current relay 121 is connected to the output terminals of rectifier 120.

A direct current relay is used as it is more reliable than most alternating current relays and requires less control current for its operation. However, it is undesirable to pass direct current through the circuit of electrode 115, as it results in pitting of the electrode. Accordingly, the rectifier 120 is connected in series with electrode 115 and is energized only when an alternating current circuit is completed through the electrode and washing solution in trap 111.

When the level of washing solution in trap 111 rises to a point where it touches electrode 115, a circuit is completed through the washing solution, energizing rectifier 120 and in turn energizing relay 121 reversing the connection of switch 121a associated therewith. A primary energization circuit is completed by movable switch arm 121a through contact 121b connecting timer motor 122 across lines 117 and 118. The initial movement of timer motor 122 reverses the connection of cam switch 122a associated therewith, completing a circuit through contact 122b connecting line 123 with line 118, energizing electrically operated vacuum valve 30 and starting the pump 20, which are connected across lines 117 and 123. Timer cam switch 122a is a double-throw switch and its movement closing contact 122b opens a connection to contact 122c in the circuit of the primary winding 119a of the sensing circuit step-down transformer rendering the liquid level sensing circuit inoperative during the emptying cycle of the system. When contact 122c opens, relay 121 is deenergized and movable arm 121a returns to the position shown in the drawing completing a circuit through contact 121c providing a secondary energization circuit for timer motor 122. After the timer has completed its cycle, cam switch 122a is returned to the position shown in the drawing, opening contact 122b and breaking the circuit to the vacuum valve 30 and the pump 20, and the secondary circuit for the timer motor itself. At the same time, contact 122c is closed readying the liquid level sensing circuit for further operation.

Manual switch 124 in line 118 may be operated to energize vacuum valve 30 and operate pump 20 continuously, if this should be desired, as during the releasing of the last washing solution.

The foregoing washing arrangement and control means for a carry away milking system provides for thoroughly washing the receiver chamber, either milk receiver 14 or tank 25 by repeatedly filling the receiver chamber with washing solution which enters the chamber forcefully creating turbulence for thoroughly washing the inner surface of the top of the receiver of milk, and the vacuum connection. The direction of flow of washing solution is repeatedly reversed in the milk line and the washing action in the milk line may be increased in suitable manner, for example, by adding an air bleed at the wash line 12.

While we have shown and described certain embodiments of our invention, it is to be understood that it is capable of many modifications. Changes, therefore in the construction and arrangement may be made without departing from the spirit and scope of the invention as disclosed in the appended claims.

We claim:

1. A washing assembly for a carry-away milking system, comprising: a reservoir for washing solution; a receiver chamber; a milk line having one end connected with said receiver chamber and a second end connected with said reservoir; conduit means connected with said receiver chamber for applying vacuum to said receiver chamber to transfer washing solution from said reservoir to said receiver chamber; intermittently operable means for removing washing solution from said receiver chamber; and means responsive to the presence of washing solution in said conduit means for discontinuing the application of vacuum to said receiver chamber and for actuating said intermittently operable means for at least partially emptying said receiver chamber.

2. A washing assembly for a carry-away milking system, comprising: a reservoir for washing solution; a receiver chamber; a milk line having one end connected with said receiver chamber and a second end connected with said reservoir; conduit means connected with said receiver chamber for applying vacuum to said receiver chamber to transfer washing solution from said reservoir to said receiver chamber; intermittently operable means for transferring washing solution from said receiver chamber to said reservoir; and means responsive to the presence of washing solution in said conduit means for discontinuing the application of vacuum to said receiver chamber and for actuating said intermittently operable means for at least partially emptying said receiver chamber.

3. A washing assembly for a carry away milking system, comprising: a reservoir for washing solution, a receiver chamber having a top portion; a milk line having one end connected with said receiver chamber and a second end connected with said reservoir; conduit means connected with the top portion of said receiver chamber for applying vacuum to said receiver chamber to transfer washing solution from said reservoir to said receiver chamber; intermittently operable means for removing washing solution from said receiver chamber; and means responsive to the presence of washing solution in said conduit means for discontinuing the application of vacuum to said receiver chamber and for actuating said intermittently operable means for at least partially emptying said receiver chamber.

4. A washing assembly for a carry away milking system having a milk line connected at one end with a milk receiver, a vacuum conduit connected to the top of the milk receiver for drawing milk through the milk line and into the milk receiver, and a pump connected with the milk receiver for removing milk from said milk receiver during milking, the pump being normally inoperative during washing, said washing arrangement comprising: a reservoir for washing solution; a connection between a second end of said milk line and said reservoir; means for applying vacuum to said vacuum conduit for drawing washing solution from said reservoir to fill said milk receiver; and means responsive to the presence of washing solution in said vacuum conduit for discontinuing the application of vacuum and for actuating said pump for at least partially emptying said milk receiver, whereby the top of said milk receiver is intermittently contacted by washing solution.

5. In a vacuum-operated washing assembly for a milking system having a milk line connected to a milk receiver, control means comprising: a vacuum conduit connected between a source of vacuum and said receiver for drawing washing solution through said milk receiver and said milk line; normally inoperative pump means for at least partially emptying said receiver; a normally open vacuum valve between said source of vacuum and said vacuum conduit; means for sensing the presence of washing solution in said vacuum conduit; and means responsive to said sensing means for closing said valve to discontinue the application of vacuum to said milk receiver and said milk line, and for rendering said pump means operative.

6. In a vacuum-operated washing assembly for a milking system having a milk line, control means comprising: a vacuum conduit connected between a source of vacuum and said milking system for drawing washing solution through said milk line; sensing means including electrode means responsive to the presence of washing solution in said vacuum conduit for closing a control circuit; and means responsive to closing of said control circuit for interrupting the application of vacuum to said milk line.

7. A vacuum control assembly for a milk line washing system, comprising: a vacuum conduit connected with said milk line for drawing washing solution therethrough; sensing means associated with said vacuum line and responsive to the presence of washing solution therein to complete an electric circuit; an electrically actuated vacuum valve connected in said circuit and opened upon actuation of said sensing means; a pneumatic valve having an operating portion connected with said electrically actuated valve and actuated by vacuum when said electrically actuated valve is opened, said pneumatic valve being connected in said vacuum conduit to control the application of vacuum to said milk line.

8. The vacuum control assembly of claim 7 wherein said sensing means comprises a paddle in said vacuum line.

9. The vacuum control assembly of claim 7 wherein said sensing means comprises an electrode in said vacuum line.

10. The vacuum control assembly of claim 7, and means for retaining said vacuum valve open a given period of time.

11. The vacuum control assembly of claim 10 wherein the last said means comprises a pneumatic time delay.

12. The vacuum control assembly of claim 10 wherein the last said means comprises an electric holding circuit.

13. A vacuum control assembly for a milk line washing system, comprising: a vacuum conduit connected with said milk line for drawing washing solution therethrough; electrode means associated with said vacuum line and responsive to the presence of liquid washing solution therein to complete an electric circuit; valve means connected in said vacuum conduit to control the application of vacuum to said milk line, and when actuated to dissipate vacuum in said milk line; normally inoperative pump means operable when actuated for withdrawing washing solution from said milk line; electric control means responsive to said electric circuit for actuating said pump and said valve means and for maintaining said valve means and said pump actuated a predetermined length of time.

References Cited in the file of this patent

UNITED STATES PATENTS

| | | |
|---|---|---|
| 2,215,018 | Schmitt | Sept. 17, 1940 |
| 2,878,819 | Thomas | Mar. 24, 1959 |